United States Patent
Dyoniziak et al.

(10) Patent No.: US 12,126,846 B2
(45) Date of Patent: Oct. 22, 2024

(54) MEDIA SIGNATURE RECOGNITION WITH RESOURCE CONSTRAINED DEVICES

(71) Applicant: Sling TV L.L.C., Englewood, CO (US)

(72) Inventors: Eric Dyoniziak, Vineyard, UT (US); Robert Drew Major, Orem, UT (US)

(73) Assignee: Sling TV L.L.C., Englewood, CO (US)

( * ) Notice: Subject to any disclaimer, the term of this patent is extended or adjusted under 35 U.S.C. 154(b) by 204 days.

(21) Appl. No.: 17/827,237

(22) Filed: May 27, 2022

(65) Prior Publication Data
US 2023/0388562 A1   Nov. 30, 2023

(51) Int. Cl.
H04N 21/233   (2011.01)
H04N 21/81    (2011.01)

(52) U.S. Cl.
CPC ......... *H04N 21/233* (2013.01); *H04N 21/812* (2013.01)

(58) Field of Classification Search
None
See application file for complete search history.

(56) References Cited

U.S. PATENT DOCUMENTS

| | | | | |
|---|---|---|---|---|
| 4,797,926 A * | 1/1989 | Bronson | ................ | G10L 25/90 704/214 |
| 6,990,446 B1 * | 1/2006 | Huang | ................ | G10L 17/04 381/94.1 |
| 7,627,477 B2 * | 12/2009 | Wang | ................ | G10L 15/10 341/110 |
| 8,516,119 B2 | 8/2013 | Banger et al. | | |
| 9,661,380 B2 | 5/2017 | Major et al. | | |
| 9,848,249 B2 | 12/2017 | Freed et al. | | |
| 10,945,048 B2 | 3/2021 | Major et al. | | |
| 11,172,269 B2 | 11/2021 | Major | | |
| 2008/0215315 A1 * | 9/2008 | Topchy | ................ | H04H 20/14 704/205 |
| 2017/0208369 A1 | 7/2017 | Major et al. | | |
| 2018/0359540 A1 | 12/2018 | Major | | |
| 2020/0111463 A1 * | 4/2020 | Sakata | ................ | G10H 5/007 |
| 2020/0213673 A1 | 7/2020 | Major et al. | | |
| 2022/0086532 A1 | 3/2022 | Major | | |
| 2022/0189459 A1 * | 6/2022 | Shan | ................ | G06F 17/142 |

\* cited by examiner

*Primary Examiner* — Hemant S Patel
(74) *Attorney, Agent, or Firm* — KW Law, LLP

(57) ABSTRACT

The present invention recognizes media content using signatures generated by network devices with limited processing power. An audio signal is prepared for application of a discrete Fourier transform (DFT). Outputs from the DFT include real components and imaginary components that are used to calculate output magnitudes associated with frequency bins. The frequency-amplitude pairs include the output magnitudes and the associated frequency bins. A signature of the audio signal is generated by selecting a predetermined number of frequency-amplitude pairs having dominant output magnitudes. The network devices that generate the signatures may transmit the signatures to a server for analysis. The server may trigger actions in response to detecting known content based on the received signatures matching known signatures.

19 Claims, 5 Drawing Sheets

MEDIA SIGNATURE RECOGNITION WITH RESOURCE CONSTRAINED DEVICES

TECHNICAL FIELD

The following discussion generally relates to media signal recognition. Various embodiments may be used in connection with media players, placeshifting devices, digital video recorder (DVR) devices, video game players, or any other devices that transmit or receive streaming media or other digital content via the Internet or a similar network.

BACKGROUND

In the past, television viewing typically occurred at home, with one or more family members gathered in front of a television to watch a broadcast program. Television consumption has evolved from CRT screens coupled with an antenna to various viewing devices and delivery systems. Viewers can watch content using phones, tablets, personal computers, set-top boxes, televisions with integrated processing, or video game systems, for example. Additional functions and features have developed as television receivers, media players and other media playback devices become increasingly sophisticated. Modern television receivers, for example, are capable of presenting additional data to accompany television broadcast content, or of taking any number of useful actions to enhance the viewer's enjoyment of their television programming.

While it would be desirable to allow the television receiver to take enhanced actions based upon the content of the advertisements or other portions of the live broadcast, this can prove difficult to implement in practice. In particular, it can be difficult for a cable provider, satellite broadcaster, or other content distributor to know in advance when certain commercials or segments of content will air. Conventional electronic program guides, for example, typically provide information about programming schedules, channel lineups and the like, but may not include accurate or complete markers of content during the broadcast. In particular, the timing and identities of commercials present in the broadcast stream or commercial air times are often unidentified or misidentified. Moreover, it is not always possible to know in advance where the ads will be located or what ads will run due to the nature of live broadcasting. During a live broadcast of a sporting event, for example, the variable commercial break times and program length make it difficult to predict which content will air and when. Further, local affiliates often modify network schedules to provide different advertising in local markets. Without accurate identification of the content, it can be a substantial challenge for the content distributor to enhance content based upon a particular stream.

The various computing devices used to watch television today also have varied levels of computing power, with many being resource constrained in terms of processing power, memory, or other operating limitations such as software. For example, some devices may be constrained by 32-bit or even 16-bit word sizes. Some devices keep costs down by using only rudimentary data types due to operating system or chip design. Other devices may be capable of storing and manipulating integers but not floating point numbers.

Modern television delivery systems may use signal recognition in some form to identify advertisements. Such recognition often uses resource-intensive computing techniques. Resource constrained devices may not be able to both support signal recognition and audio-video playback. Some resource constrained devices that can support signal recognition may not be capable of doing so in real-time.

It is therefore desirable to create systems, devices, and methods to reliably and quickly allow a content distributor to identify the specific contents of a particular television broadcast, such as the timing and content of advertisements, using resource constrained hardware. These and other desirable features and characteristics will become apparent from the subsequent detailed description and the appended claims, taken in conjunction with the accompanying drawings and this background section.

SUMMARY

Various embodiments relate to different automated processes, computing systems, devices, and other aspects of a data processing system executed by a processor to generate signatures for media content. The automated process includes the steps of receiving an audio signal and selecting a window of the audio signal over a predetermined interval. Audio amplitudes of the audio signal are scaled into integers to generate scaled amplitudes of the audio signal. The client device multiplies the scaled amplitudes of the audio signal by weighted multipliers from a first lookup table to generate tapered amplitudes of the audio signal. The first lookup table includes a plurality of weighted multipliers that apply a window function by simple multiplication. A discrete Fourier transform (DFT) is applied to the tapered amplitudes to generate outputs associated with frequency bins. The outputs from the DFT include real components and imaginary components, with output magnitudes being calculated for the frequency bins based on the real components and the imaginary components to generate frequency-amplitude pairs. The frequency-amplitude pairs include the output magnitudes and the frequency bins. A signature of the audio signal is generated by selecting a predetermined number of frequency-amplitude pairs having dominant output magnitudes.

Some embodiments provide an automated process executed by a client device to generate signatures for media content. The automated process includes receiving an audio signal and selecting a first window of the audio signal having a predetermined window duration. The first window starts at a first start time. The automated process may generate a first signature of the audio signal in the first window and may include a first set of frequency-amplitude pairs. The first signature is transmitted to a server for analysis. The automated process further includes selecting a second window of the audio signal that begins at a second start time shifted by a predetermined shift interval from the first start time. The second window also has the predetermined window duration. The client device generates a second signature of the audio signal in the second window that includes a second set of frequency-amplitude pairs. The second signature is transmitted to the server for analysis.

Other embodiments could relate to a server device comprising a processor, a non-transitory data storage, and an interface to a network, wherein the non-transitory data storage is configured to store computer-executable instructions that, when executed by the processor, perform an automated process to analyze signatures of media content. The automated process includes receiving a first signature that includes a first set of frequency-amplitude pairs associated with a first piece of content. The server compares the first signature with stored signature from a signature database. Each of the stored signatures may include a stored set of frequency-amplitude pairs. The stored signatures correspond to known content. The server detects that the first piece of content is known content in response to the first signature matching a second signature from the stored signatures. The second signature is associated with the known content. Other devices, systems, and automated processes may be formulated in addition to those described in this brief summary section.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the illustrations.

DETAILED DESCRIPTION

Figure 1:
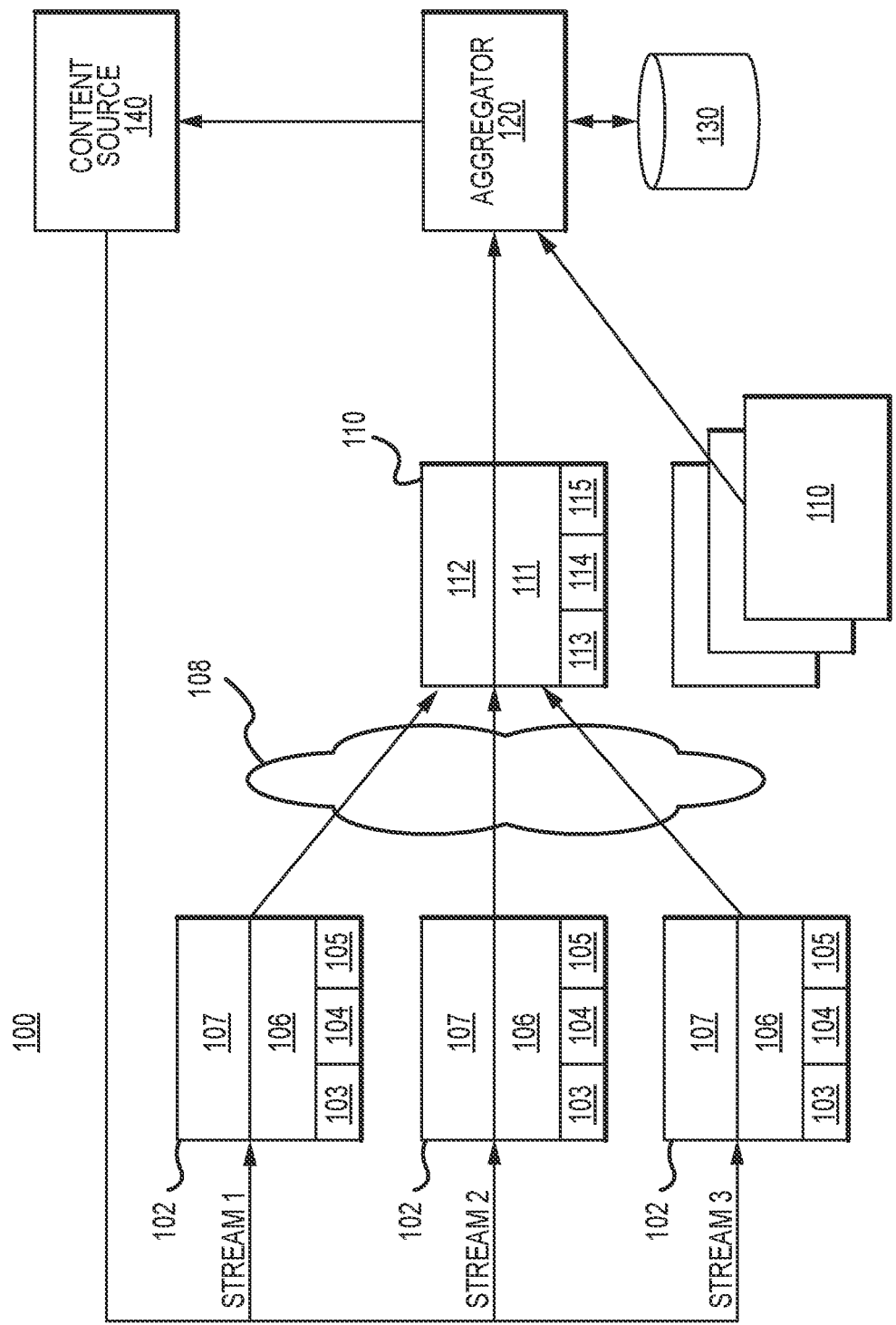
FIG. 1 illustrates an example of a system for recognizing media content using resource constrained devices.

The following detailed description is intended to provide several examples that will illustrate the broader concepts that are set forth herein, but it is not intended to limit the invention, application, or uses of the invention. Furthermore, there is no intention to be bound by any theory presented in the preceding background or the following detailed description.

Various embodiments recognize patterns in media content in part based on signatures, which can be generated by resource constrained hardware that is used by content consumers to consume the media content. The media content is used to generate a simple signature based on the most prominent audio frequencies present in the media content. The signature generation process may be lightweight and suitable for running on resource-constrained devices such as, for example, set-top boxes (STBs). This allows for effective recognition of media content in real-time or near-real-time.

According to various embodiments, audio signal identification techniques are used to identify the specific contents of audio-visual content. Advertisements or other portions of interest can be effectively and quickly identified in a content stream by matching identified audio signals. Signal analysis to generate content signatures can be performed on a network of resource-constrained devices in communication with centralized servers. The content identification is then performed by a centralized server by comparing known content signatures with signatures generated by the network of resource constrained devices. Some embodiments thus detect actually-broadcast content before the content is consumed, when the information can still be used to enhance the viewer experience. Such identification completed using distributed viewing devices and a centralized content aggregator tends to be more reliable, more flexible, and faster than prior techniques.

Rapid identification by the aggregator allows any number of beneficial actions to be made based upon the program content. Advertisements or other content can be identified in real time as they are broadcast, for example. This information can be distributed viewers in real time to supplement the viewing of a live broadcast. Certain advertisements could be supplemented, for example, with links to purchase sites or to additional information about the product being advertised. Other embodiments could enable second screen applications (e.g., games or other features played on a smartphone, tablet, remote control or other device) related to the content that the viewer is watching. Still other embodiments could use the information obtained from the audio signatures to skip over the ads in a broadcast, to prevent skipping over the ads (e.g., by disabling trick play while the ads are being broadcast), to replace the ads with other content, adjust volume levels during ads, or to perform any other actions as desired. Moreover, the information obtained from the audio signatures is stored with content management data that can be shared with other services that might process the received content, such as placeshifting, timeshifting or the like. These and other examples are described more fully in U.S. Pat. No. 11,178,469, which is incorporated by reference herein for any purpose.

With reference to FIG. 1, an example system 100 for recognizing media content is shown according to various embodiments. System 100 includes a client device 102 in communication with a server 110 over network 108. Network 108 may include a wide area network (WAN) such as the Internet, a telephony network, a public or private network of any sort, a cellular network, or the like. Network 108 can be based upon TCP/IP protocols, or any other protocols as desired, including any protocols subsequently developed. Equivalent embodiments may integrate device location of client device 102 or streaming via local area networks.

Client device 102 can be any device capable of communicating on network 108 to send signatures or metadata to server 110. For example, client device 102 may be a mobile phone, tablet, computer, television, smart speaker, soundbar, or a similar device communicating on network 108. Client device 102 includes hardware (e.g., processor 103, memory 104, input/output interfaces 105, permanent storage, bios, and the like) and an operating system 106 capable of supporting a signature identification application 107. Signature identification application 107 may include logic for media decoding, sequencing, rendering, processing, or the like.

In some implementations, client device 102 is a home-type server such as a local storage digital video recorder (LSDVR), placeshifting device, remote storage digital video recorder (RSDVR), or other media server device. One example of client device 102 suitable for use in some implementations could be the AirTV Classic device that is available from http://www.airtv.net, although equivalent embodiments could be used with any number of other DVRs, media receivers/players, video on demand (VOD) servers, set top boxes, video game consoles, time or place shifting devices, computers, tablets, smartphones, or the like. U.S. Pat. No. 7,795,062 provides additional detail about several examples of place shifting devices and techniques, and is incorporated by reference herein for any purpose.

In various embodiments, signature identification application 107 and its various components are implemented using software or firmware logic that is stored in memory 104 for execution by processor 103. Equivalent embodiments could use other computing structures and systems to implement similar features as desired. Client device 102 transmits signatures to server application 112 running on server 110.

Servers 110 are network devices having conventional hardware such as a processor 113, memory 114, and input/output interfaces 115 (e.g., a network interface), and an operating system 111 running server application 112 having various processing routes and modules. Server 110 may be a standalone server, virtualized server, distributed computing cluster, container, networked computing devices, or other computing resources capable of communicating with client device 102 over network 108. Server 110 may be running one or more instances of server application 112 on operating system 111. Multiple instances of server 110 may be spun up and running in virtualized or distributed environments in response to high computing loads. Servers 110 run multiple applications that are ancillary to audio signal recognition as described herein. The various instances of server application 112 are in communication with client devices 102 to receive signatures of media content.

Client devices 102 receive media from content source 140 or other media sources. For example, a suitable media source may be a local storage device formatted to include a database of media content, a file server, a cloud storage system, a content delivery network (CDN), a television broadcaster, a video game device, a social media platform, an online video repository, a time or placeshifting device, or the like. Media content includes an audio component and may optionally include a video component, as signatures described herein are generated primarily based on audio signals.

The media content delivered to client devices 102 is selectable by input on client device 102. Suitable content includes time or place shifted video, video on demand, over-the-air broadcasts, satellite broadcasts, video streams, or other media content for selection and display on client devices 102. Client devices 102 can also tune to broadcast channels to view scheduled programming in some embodiments. For example, stream 1 may be a television channel broadcast by satellite, stream 2 may be a television channel broadcast over network 108, and stream 3 may be an over-the-air broadcast.

Equivalent concepts could be implemented in any number of other devices or systems. Client devices 102 are spread across different geographic regions and configured to analyze media content to generate signatures. The signatures are representations of the media content in the frequency domain. For example, the signature may be set of amplitude coefficients over a frequency domain comprising predetermined frequency bins. The signature is made up of pairs of frequency and magnitude for a predetermined number of largest magnitudes. Any number of frequency-magnitude pairs may be used if the number of pairs is suitable to serve as a signature for an audio signal (e.g., 1, 2, 3, 4, 5, 6, 7, 8, 9, 10). In an example embodiment, the signature comprises the set of the five frequency-magnitude pairs having dominant magnitudes (i.e., the 5 largest magnitudes) detected in a segment of media content. Including a greater number of frequency-magnitude pairs in a signature tends to yield more accurate results compared to embodiments that include fewer frequency-magnitude pairs in a signature.

Client devices 102 may also transmit metadata to server application 112 related to the signatures in some embodiments. Metadata can include a source channel, source IP address, source port, source name, timestamp, geolocation, internet service provider, device identifier, or other metadata suitable for identifying the source, location, and time the media content was replayed or recorded. Metadata assists in identifying the content associated with a signature.

In some embodiments, server 110 is in communication with content source 140 to prepare content for consumption by end users. Content source 140 can deliver content on the Internet or another network 108 as part of an RSDVR, VOD or other media streaming service. A media player application executing on one or more client devices 102 may include logic to select content as needed to obtain and playback the media programs of stream 1, stream 2, stream 3 or other media. Content may be readily routable on network 108 and may be served by conventional CDN or other web-type servers, thereby providing a convenient mechanism for distributing media streams to a variety of different client devices 102 on network 108.

Again, other embodiments may use various encoders for encoding cable television signals, DBS signals, or the like. Still other embodiments may omit the encoding function entirely and perform audio fingerprinting and recognition separately from the distribution function. Various embodiments may realize substantial benefits by integrating the identification information obtained from audio fingerprinting into content management data.

Audio signatures may be collected in real time as the program streams are received at client devices 102, thereby allowing for rapid identification of then-current broadcast content. This information may be readily incorporated into electronic program guide (EPG) data or other content management data that is provided to the television receiver or other playback device.

In some embodiments, a content management system is included in content source 140 using conventional processors, memory, storage, and input and output features commonly associated with data processing systems, including any sort of cloud-based resources. Many content aggregators currently use content management systems to manage and distribute electronic program guide (EPG) data and other information about the programs distributed within system 100. These systems may be expanded to process information relating to advertisements or other portions of the content stream, or to associate actions to be performed by the viewer or the playback device based on the content of the stream.

The content source 140 delivers the content in stream 1 and stream 2 to client devices 102. Client devices 102 can also receive stream 3 or other streams from other sources such as, for example, streaming services, on-demand services, over-the-air broadcasts, recorded content, web content, or other content sources. The stream content may be modified in response to signature data received by servers 110 from client devices 102. Signature data may thus be used in a feedback loop to modify content consumed in the future.

Although some implementations may incorporate conventional EPG data (e.g., data obtained from a vendor or other source), the system 100 may operate absent metadata describing the stream associated with a signature received from a client device 102. Various embodiments use channel and time data associated with a stream in correlating signature data received from client device 102 with known programing, advertisements, or other content. Advertisements, for example, could be referenced by their channel and broadcast time so that additional actions unique to those advertisements could be enabled.

Client device 102 extracts programming signals from the incoming streams and analyzes the audio components of the signals to generate signatures. Client device 102 analyzes the audio signal associated with an incoming content stream in overlapping windows having a predetermined window interval. For example, client device 102 may continuously sample incoming audio data in windows having a window interval of 100 milliseconds (ms). The starting time of consecutive windows are staggered or shifted relative to one another by a predetermined shift interval. Consecutive windows may have start times shifted in increments of 25 ms, for example. Suitable window intervals may range from 5 ms to 500 ms, from 20 ms to 150 ms, from 50 ms to 150 ms, or any other desired interval.

The shift interval is typically shorter than the window interval. Consecutive windows thus have their start times staggered by a shift interval such that consecutive windows include overlapping sections of the programming signals. A shift interval of 25 ms and a window interval of 100 ms would result in consecutive windows overlapping by 75 ms.

The shift intervals for consecutive windows may be 5 ms, 10 ms, 15 ms, 20 ms, 25 ms, 30 ms, 35 ms, 40 ms, 45 ms, or 50 ms, or any other desired shift interval. The shift interval of consecutive windows may be less than the window interval to limit data loss. The shift interval of consecutive windows may be greater than the window interval such that consecutive windows do not overlap. A shift interval greater than the window interval may tend to conserve computing resources with an increased risk of data loss.

Client devices 102 analyze each window to identify pairs of magnitudes and frequency bins representative of the audio signal in the window. The frequency bins may be predetermined based on the sampling rate applied by client device 102. For example, suitable sampling rates may include 2 kilohertz (kHz), 4 kHz, 8 kHz, 16 kHz, 32 kHz, 48 kHz, 64 kHz, or 96 kHz. Continuing the foregoing example, the above sampling rates applied in a sampling interval of 100 ms would result in sample quantity (N) of 200, 400, 800, 1600, 3200, 4800 6400, or 9400 samples per window. Sampling rates and window intervals are predetermined to enable pre-computation of window functions for the sample quantity N.

Window functions are precalculated and stored in lookup tables as weighted multipliers in various embodiments. Window functions are applied at client device 102 by performing a lookup and multiplying an input value by the weighted multiplier. Window functions based on trigonometric functions suitable for use by client device 102 include Hamming windows, Hann windows, Nuttall windows, Blackman windows, flat top windows, or Rife-Vincent windows, for example, although other window functions may be used in various embodiments. The window functions may be stored in lookup tables having N rows for each selected sampling quantity N. The fixed sampling quantity enables pre-calculation of the desired window function.

Client device 102 also stores precomputed values including factors, remainders, and n-so-far values for each sampling quantity N. The Chinese Remainder Theorem may be used to calculate factors in various embodiments. The precomputed values are used in selecting the optimized discrete Fourier transform (DFT) functions for use with the selected sampling rates and window intervals resulting in the selected sampling quantity N.

Computing device 102 applies an optimized DFT for each precalculated value for sample quantity N. Computing device 102 uses lookup tables to limit the DFT math operations used at client device 102 to a subset of multiplication, division, addition, subtraction, and value lookups. For example, a lookup table may contain sine, cosine, or other trigonometric function values for the precalculated factors of the sampling quantity N so that computing device 102 can conserve resources that would be used calculating trigonometric functions in real-time. Some computing devices 102 with limited computing power use fixed point integers to perform the DFT. The word size used by computing device 102 may be 16 bits, 32 bits, or 64 bits. In a 32 bit example, the 10 least significant bits of a floating point integer may be used to represent the decimal value, and 22 bits of the 32 bit word may be used to represent the whole number component of a value.

In various embodiments using fixed point integer multiplication, values are shifted after the multiplication function is applied. Each multiplication product is divided by $2^{10}$ to shift the values in the 32-bit example. The end value is divided again by $2^{10}$ to adjust the value into a readable floating-point integer. Multiplication products are also rounded to the half bit if set.

In various embodiments, the output from each DFT has a real component and an imaginary component associated with a frequency bin. Each frequency bin has a corresponding output magnitude based on the real component and the imaginary component. Computing device 102 may also implement a square root function using a lookup table in calculating magnitude values. A square root function implemented on computing device 102 can also be a native fixed-point integer square root function. Magnitude is equal to the square root of the sum of the real component squared plus the imaginary portion squared. The combination of the magnitude and corresponding frequency bin forms a frequency-magnitude pair for each frequency bin.

The signature of an analyzed window is made up of dominant frequency-magnitude pairs. The term dominant as used in association with magnitudes refers to the magnitudes having the greatest values. The signature is thus made by selecting a predetermined number of frequency-magnitude pairs that have the largest magnitude values (e.g., largest 3 magnitudes, largest 4 magnitudes, largest 5 magnitudes, or largest 6 magnitudes). For example, the signature may comprise five dominant frequency-magnitude pairs (i.e., the five frequency-magnitude pairs with the largest magnitude values) detected in a window.

Client device 102 transmits the signature of the windows of media content to server-side devices (e.g., server 110, aggregation server 120, or content source 140) for analysis. The signature data (e.g., the set of dominant frequency-amplitude pairs) can be compared to signature data previously stored in a database 130 to identify portions of known content in the program stream. Commercials, for example, can be recognized when the audio component of the stream 1 contains a same or similar signature to known signatures of advertisements stored in database 130. The signatures stored in database 130 may be obtained from human data entry, from a content source (e.g., an advertiser, broadcaster or network), from client devices 102, from servers processing streams, or from any other source as desired. Database 130 may make use of conventional database software (e.g., database products available from Microsoft, IBM, Oracle or any other vendor), or the database 130 may be a custom database developed to store audio signature data, as desired. Database 130 may include structured or unstructured datastores. Database 130 may reside on the same computing hardware as server 110, aggregation server 120, or content source 140 or on separate computing resources.

System 100 is able to identify advertisements or other contents of the received television broadcasts using audio signatures. Audio signatures may be collected or analyzed in parallel with the encoding stream 1, stream 2, or stream 3 for consumption on a digital network. In some implementations, audio signature analysis and content identification are also performed in parallel for multiple channels that may be simultaneously received by server 110, aggregation server 120, or other devices for any purpose.

In other implementations, audio signature analysis and content identification are performed in parallel for multiple feeds of the same channel that may be simultaneously received by server 110, aggregation server 120, or other devices for any purpose. For example, stream 1, stream 2, and stream 3 may be three different streams of the same channel as received at different devices 102. System 100 may receive multiple streams of the same channel from different devices 102 in different regions and combine the streams into one clean signal stream for that channel. Using multiple streams of the same channel enables system 100 to reconcile errors (e.g., data gaps, encoding differences, retransmission timing and other changes, misreported zip codes, etc.). Using multiple streams of the same channel as described above tends to improve resilience due to mitigate the sometimes unreliable nature of broadcast television.

Continuing the above example in which multiple streams of the same channel are combined into a single stream, the single stream may be passed to the server 110, aggregation server 120, or another server-side device for content detection or discovery. Discovery may be performed with the single combined stream in some embodiments. New data is compared against old data to find a well-fitted repetition (e.g., correlating the signal to itself looking for a strong correlation of data from a start time to a different point in time and holding a strong correlation for a duration of time). The repetition, if exhibiting certain qualities (e.g., strong signature match and ad-like duration of 15-30 seconds), may be identified as a discovered ad. The newly discovered ad may have its signatures cut as a clip to add to database 130.

In addition to audio fingerprinting, for example, the content source may use the signature data for encoding modified media streams for distribution on a digital network, for aggregation and redistribution over a DBS or cable distribution system, for generating content stored on a remote storage digital video recorder (RSDVR) or video on demand (VOD) service, or for any other purpose.

In some embodiments, server 110, aggregation server 120, or content source 140 stores signature data in database 130 for known media content with metadata describing the media content such as title, duration, first detection date, content source, or other descriptive information. The descriptive information may describe the contents of an identified portion (e.g., "ad", "shoe ad", "action scene", "Battle for Helm's Deep", etc.) using text or any code. Since the information is often obtained from an actual live broadcast, it will typically be accurate in both timing and content even if programming is delayed or otherwise modified from a predetermined schedule for any reason. The information could thus be used to provide very accurate indexing through the broadcast.

Aggregation server 120 or content source 140 may store signature data in database 130 for known media content with metadata describing actions suitable to take in response to detecting known content. Action information may trigger an action on client device 102, a playback device, server 110, aggregation server 120, or content source 140, as described more fully below. A playback device could, for example, be programmed to offer a weblink to an online shoe retailer whenever a "shoe ad" is run, to replace content, or to offer additional content, or to take any other action.

Description or action data can be sent to any sort of media player, television receiver, network server or other recipient in any manner. In various embodiments, data including information obtained from audio signatures is provided as part of EPG information delivered to set top boxes or other television receivers associated with cable, DBS, or other distributors. Such information may be delivered using a batch delivery, when possible, or in real time as desired. Data may also be provided to television receivers or other playback devices via a network service such as content source 140 or a separate network server 110. Server 110 may be useful in, for example, providing the content information to a smart phone, tablet or other computer, video game player, remote control device or other "second screen" that may be used by the viewer while they are also watching broadcast television. Such data could include action data that triggers games, applications, weblinks or other features accessible using the second screen that are time coordinated to the advertisements or other programming that is currently viewed on a television or other display. Again, many other embodiments could incorporate any number of additional or alternate features to take advantage of the real-time identification capabilities of system 100.

Figure 2:
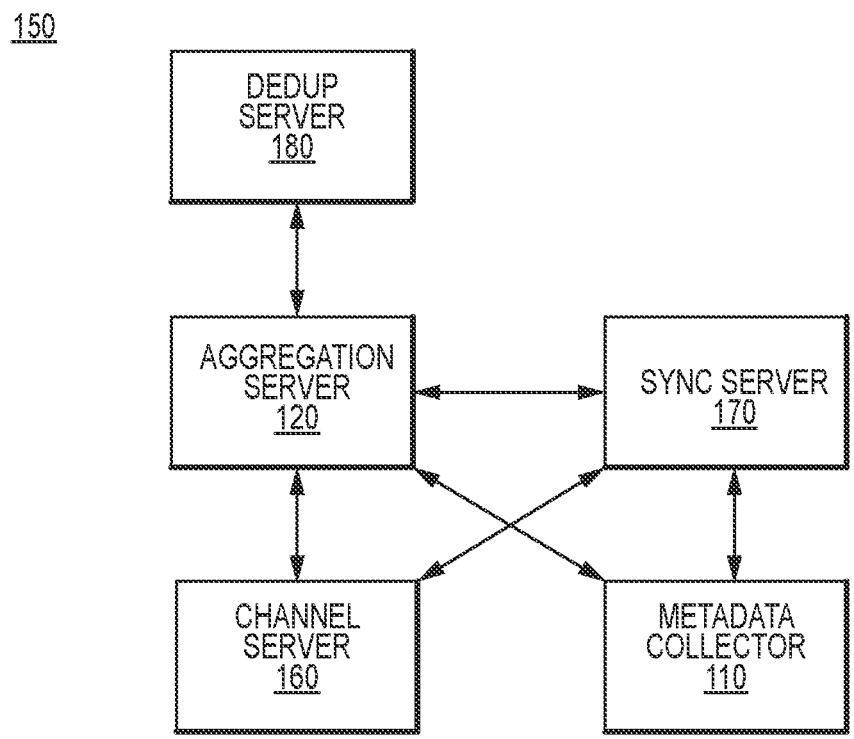
FIG. 2 illustrates an example of a server-side system for recognizing media content.

With reference to FIG. 2, an example system 150 is shown according to various embodiments. System 150 is compatible with system 100 of FIG. 1 described above. The same reference numbers used in system 100 of FIG. 1 are used in FIG. 2 to identify the same or similar components of system 150. Although the servers of system 150 are depicted as separate and may run on separate hardware, the servers of system 150 may also run on the same hardware or shared computing resources. For example, server 110, aggregation server 120, channel server 160, and sync server 170 may be running on cloud-based infrastructure. System 150 may include multiple instances of server 110, aggregation server 120, channel server 160, and sync server 170. For example, each aggregation server 120 may contain or otherwise be in communication with 20 sync servers 170. Each sync server 170 may process signature data for one channel along with relevant metadata associated with the channel. In the depicted example of FIG. 2, server 110 is thus also referred to as a metadata collector.

Server 110 collects data relating to several streams from several client devices as depicted in FIG. 1. Audio signature analysis and content identification are performed in parallel for multiple streams of the same channel that may be received by server 110 simultaneously. Server 110 generates a single stream from the multiple streams of the same channel. The single stream may be represented as signature data generated as described herein. The signature data for the single stream is transmitted for analysis and archival by sync server 170 and aggregation server 120, respectively. In that regard, server 110 receives input data from multiple client devices, compiles the multiple streams into a single stream with reduced flaws or artifacts, and outputs the single stream to aggregation server 120 and sync server 170.

Channel server 160 generates a single channel stream for analysis for a predetermined or dynamically scaling number of channels. For example, channel server 160 may be ingesting streams for 20 channels and processing the 20 streams as described herein. Channel server 160 may also be generating signature data for all channels as a form of redundancy. Channel server 160 generates signatures for each stream and sends the signatures to aggregation server 120 and sync server 170. Channel server 160 may receive streams directly from a source such as content source 140 of FIG. 1, from content files, from transport files, or other suitable formats. Channel server 160 may also receive channels directly from a broadcaster without receiving and decoding an over-air broadcast, for example, by communication over network 108 of FIG. 1. Channel server 160 and server 110 output similar analysis of channel streams in signature format for use by aggregation server 120 and sync server 170. For example, the channel server 160 and server 110 may transmit streams in the .cai file format to aggregation server 120 and sync server 170, though other file formats may also be suitable in various embodiments.

Aggregation server 120 keeps signal histories for each channel. Aggregation server 120 stores markers and clips for content of interest. For example, aggregation server 120 may store markers and clips for advertisements. Aggregation server 120 may be in communication with multiple instances of sync server 170 and may report markers and clips identified by a one sync server to other sync servers.

Sync server 170 is typically one of many in embodiments where each sync server 170 is assigned to analyze a single channel. In such embodiments, channel server 160 and server 110 send samples or signature data from each channel to its own sync server 170. Sync server 170 receives data for its channel and matches clips of channel data to clips of previously detected content of interest. Sync server may match channel data and identify content of interest using audio signatures as described herein. Sync server 170 notifies aggregation server 120 in response to matching a clip or identifying new content of interest.

Sync server can perform full analysis of entire segments of content of interest by comparing signatures over the full duration of content of interest with the full duration of stored signatures associated with known or previously encountered content. Sync server may also perform a shorter real-time analysis. Real-time analysis may include comparing the first few seconds of signal to the first few seconds of stored signatures. For example, sync server may perform real-time analysis by matching 4 seconds of signature data to the first 4 seconds of a stored signature to detect a match. Sync server 170 then issues a real-time match notification. Matching the first few seconds using the real-time matching technique tends to identify content with accuracy approaching approximately 99%.

Systems 100 and 150 can detect duplicate ads to reduce duplicative ad storage in database 130 or elsewhere. Deduplication server 180 may run against signature data stored by aggregation server 120 (e.g., in database 130) on a regular interval to remove duplicate entries. Systems 100 and 150 receive signatures of ads identified by client devices 102 through server 110 or identified by a channel server 160. Signatures may be received across multiple channels, media sources, streams, or other audio or audiovisual content sources. Deduplication server 180 de-duplicates the ads identified on various channels by assigning a single unique identifier to ads having the same signature but appearing on different channels or at different times. Duplicate entries are deleted, with the assigned unique identifier serving as a primary key in some embodiments. Deduplication server 180 may use the signatures and matching techniques described herein to identify duplicate entries in the data store of previously encountered advertisements and other content of interest.

By deduplicating advertisements or other content stored on systems 100 and 150 for detection, the number of unique values that server 110, aggregation server 120, content source 140, or sync server 170 have to parse through to identify an ad or piece of content is reduced. Storage used to store signatures and associated data for duplicate advertisements or other duplicate content of interest is also reduced. Advertisement identification may thus tend to happen quicker on system 100 that is deduplicating advertisements. Ad detection and deduplication may be performed across systems 100 and 150. For example, ads played on various client devices such as TVs, sound bars, set-top boxes, smartphones, and other devices from various manufacturers may be analyzed at the client device 102 to generate a signature, which is analyzed and deduplicated by centralized server-side devices such as server 110, aggregation server 120, or content source 140. The centralized server-side devices may also deduplicate ads in signature data received from other sources such as through channel server 160.

Figure 3:
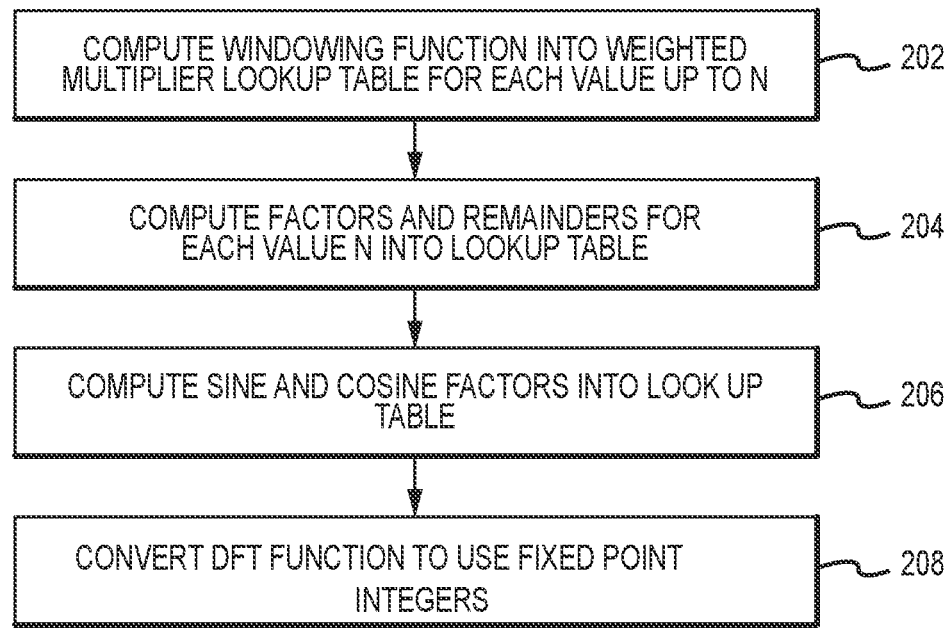
FIG. 3 illustrates an example process for preparing a signature identification application for execution on resource constrained devices.

Referring now to FIG. 3, an example process 200 is shown for generating a signature identification application 107 for execution on client device 102 with limited computing resources, in accordance with various embodiments. Process 200 tends to use minimal computing resources to execute signature identification application 107 by precomputing complex functions and converting inputs to integers.

Process 200 includes computing a window function into a lookup table of weighted values for multiplication (Block 202). Any signal window function may be used. The values stored in the lookup table include constants suitable for multiplication with values from a window sample. On execution by signature identification application 107, the window function is applied using a simple multiplication of a weighted multiplier (i.e., a constant) and input value.

Process 200 includes precomputing factors and remainders for supported values of N (Block 204), where N is the sampling quantity described above. Multiple lists of factors and remainders may be computed and stored for the supported N values (e.g., 800, 1600, 3200, 4800, or any other desired value). Factorization of the sampling quantity N may be used for loop controls and DFT selection upon execution of signature identification application 107 by client device 102. Factor lists or remainder lists may be compiled into the binary of signature identification application 107 or stored in lookup tables. On execution, signature identification application 107 may loop through the lists and select the DFT values for use based on the current position value (e.g., the integer value from 1 to sampling quantity N) in the list. Upon execution, signature identification application 107 may repeat the loop based on value of the remainders list, as some of the DFT may include control loops based on remainder values.

In various embodiments, trigonometric functions are precomputed into lookup tables (Block 206). Sine and cosine of the factors (calculated in block 204 above) are precomputed and stored in a lookup table. On execution by signature identification application 107, each DFT corresponds to a factor from block 204. The factor corresponding to a DFT may be used to look up the sine or cosine result to use in applying a DFT. Precomputing trigonometric functions into a lookup table may tend to reduce computing power used by client device 102 in generating signatures.

Various embodiments convert a DFT function to use fixed point integers (Block 208). Converted DFT functions use fixed point integers depending on capability of client devices 102 expected to run signature identification application 107. Constants may be converted from float to int32 or int64, for example. Multiplications and divisions may include place shifting or rounding as described above. The results from the foregoing steps may be compiled to generate signature identification application 107 for execution on client device 102.

Figure 4:
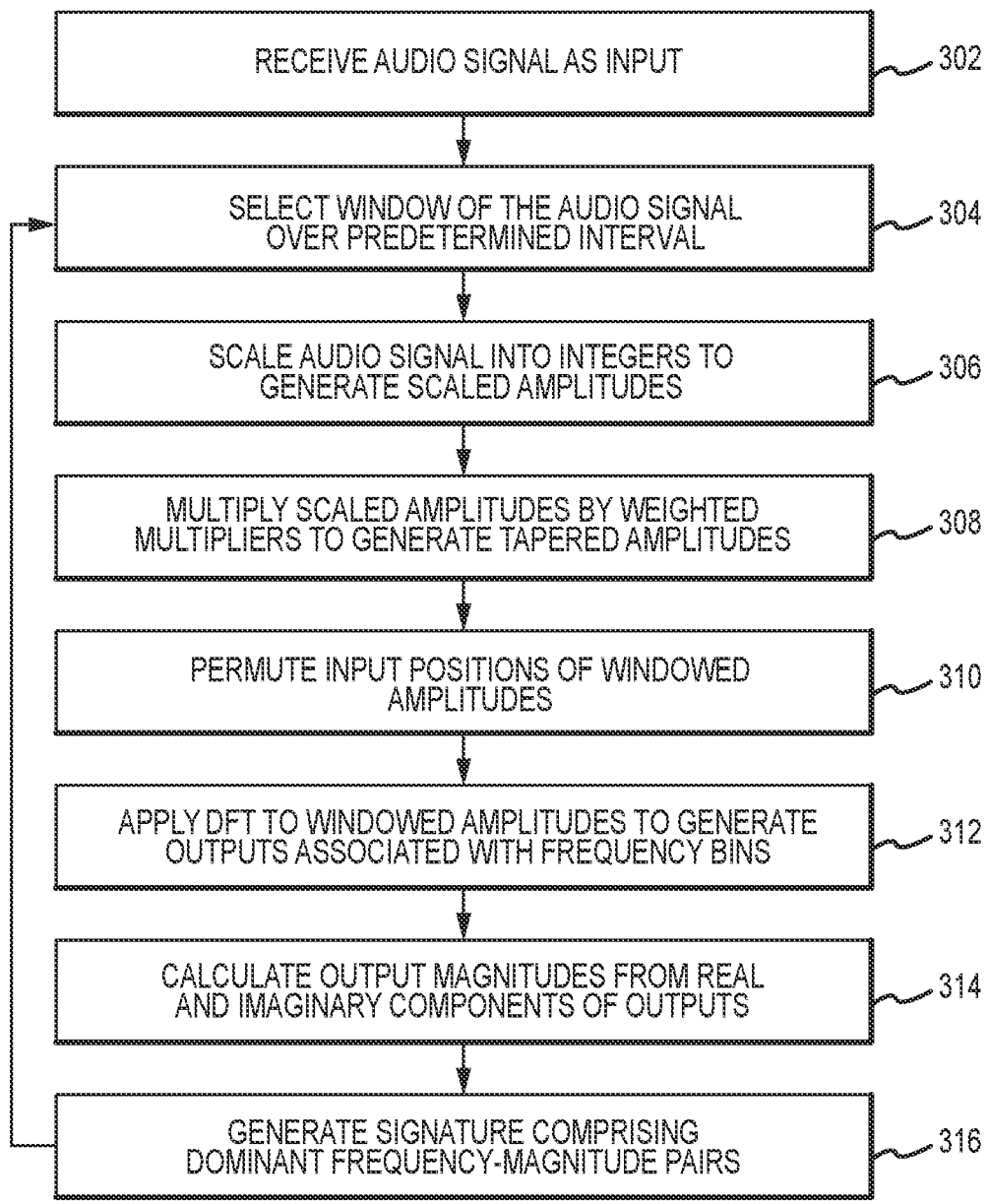
FIG. 4 illustrates an example process for generating signatures of media content using resource constrained devices.

With reference to FIG. 4, an example automated process 300 is shown for generating a fingerprint of content having an audio component. Automated process 300 generally analyzes the audio portion of content to generate a signature. The signatures may thus be used whether or not video content is paired with the audio content. Automated process 300 is executed by client device 102 by running signature identification application 107.

Client device 102 receives an audio signal as input (Block 302). The audio signal is divided into windows (Block 304) having predetermined window intervals and shift intervals as described above. The input includes amplitude values from an audio signal. The amplitude values may enter client device 102 with a value between −1 and 1. Client device 102 may take the input values and normalize or scale the values into an integer format (Block 306). For example, client device 102 may scale an input into a 16 bit integer. The normalization may include conversion or scaling from any type of number, typically floats, into a 16-bit integer. Continuing the example, audio amplitudes may be received as input in the range [−1.0, 1.0] and may map to the range of values [−32768, 32767] when using signed 16-bit integers.

The mapping function is linear such that input amplitude values are proportional to scaled amplitude values. Although 16-bit integers are used in the foregoing example, other integer word sizes may be used based on the configuration of client device 102. The scaled output value (represented by $X_n$ below) is a real component for input into additional functions described below, and the corresponding imaginary input is set to zero. Client device 102 may thus output a list, series, array, or similar data structure of real values $X_n$ for all integers n from 1 to N (i.e., sampling quantity N). The imaginary value $X_i$ for all integers i from 1 to N may be zero.

Various embodiments of automated process 300 include client device 102 multiplying the scaled amplitudes by weighted multipliers to generate tapered amplitudes (Block 308). The weighted multipliers are stored in a lookup table generated as described above to implement a window function using simple multiplication. Client device 102 applies the window function by multiplying the scaled amplitude values by a looked-up weight to generate tapered values. For example, the tapered values $X'_n$ may be calculated using simple multiplication as $X'_n = \text{weight}(r)*X_n$, for all integers n from 1 to N (i.e., sampling quantity N) where weight(r) is the looked-up weight value. The output of the window function will be tapered values $X'_n$ for each scaled amplitude $X_n$. The output values may be stored in a list, series, array, or similar data structure suitable for holding N (i.e., sampling quantity N) values. Windowing tends to limit spectral leakage.

In some embodiments, client device 102 permutes input positions (Block 310). Input positions are the ordered position represented by integers from 1 to N (i.e., sampling quantity N). Input positions may be rearranged when applying a fast Fourier transform (FFT) such as, for example the Cooley-Tukey FFT algorithm. Frequency bins shift relative to one another as a result of applying an FFT in some embodiments. For example, if each bin is incremented by 10 Hz, permutation may result in the output bins being ordered such that bin 1 is 10 Hz, bin 2 is 20 Hz, bin 3 is 30 Hz, etc.

In various embodiments and for each factor of N, client device 102 applies the factor's corresponding DFT to the tapered values $X'_n$ to generate real output values $Y_r$ and imaginary output values $Y_i$ (Block 312) for each integer n from 1 to N. Client device 102 running signature identification application 107 may apply fixed point DFT prepared using process 200 and described above to generate the output values. The DFT may execute without computing the factors of N during execution, as factors may be precomputed in process 200.

In various embodiments, system 100 performs filtering functions after application of the DFT. For example, a low pass filter may be applied to the output bins before selecting the largest magnitude pairs (e.g., in block 316 below). Application of post DFT filter functions may be applied in a manner similar to the window functions described above. A table lookup may be generated with weighted multiplication values. The output bins from the DFT may be multiplied against lookup values to apply a filtering function. Filtering functions may be applied before or during magnitude calculation and signature composition.

In a practical example, broadcasters sometimes apply a low frequency bias to audio signals to assist humans in hearing lower frequencies. The bias can artificially increase the magnitude of lower frequencies in the audio signal, which can bias the signature generation process to select low frequencies for the signature. System 100 can thus apply a low-pass filter to reduce the magnitude weight of low frequencies in during signature selection. Application of a low-pass filter may tend to overcome the loudness bias that low frequencies sometimes have. Examples of other filtering functions that can be applied include high-pass filters, or filters to increase the magnitude weight in the human vocal range, or other filters to selectively reduce or introduce bias. For example, a filter function may be applied to mirror a human frequency perception profile.

Client device 102 calculates output magnitudes from the real output values $Y_r$ and an imaginary output values $Y_i$ (Block 314). The output magnitude is associated with the same frequency bin as the real and imaginary values used to generate the output magnitude for each integer n from 1 to N (i.e., sampling quantity N). Client device 102 may use an optimized, integer-based square root function as described above to determine a magnitude for each output. The magnitude value is equal to the square root of the sum of the real output value squared and the imaginary output value squared (i.e., $\text{sqrt}(Y_r^2+Y_i^2)$). The output magnitude value is calculated for each frequency bin.

Client device 102 generates a signature (Block 316) comprising a predetermined number of dominant frequency-magnitude pairs. Client device 102 selects the frequency-magnitude pairs having the greatest magnitude values to construct the signature for a window of media content. A predetermined number of dominant frequencies may be selected for a signature, as described above. The resulting signature for an audio signal is thus a set of frequency-magnitude pairs. The resulting signature is unexpectedly accurate in view of the precision lost by rounding and shifting values to operate on a client device 102 having limited processing capabilities. The signatures generated by client devices 102 using automated process 300 may be used by centralized computing devices such as server 110, aggregation server 120, or content source 140 to identify known or previously encountered content. Content of interest may be, for example, advertisements, intros, outros, or other content suitable for identification by sound signature. Content of interest in some embodiments is advertisements in stored media content, enabling system 100 to delete advertisements from stored media content and save storage space.

Figure 5:
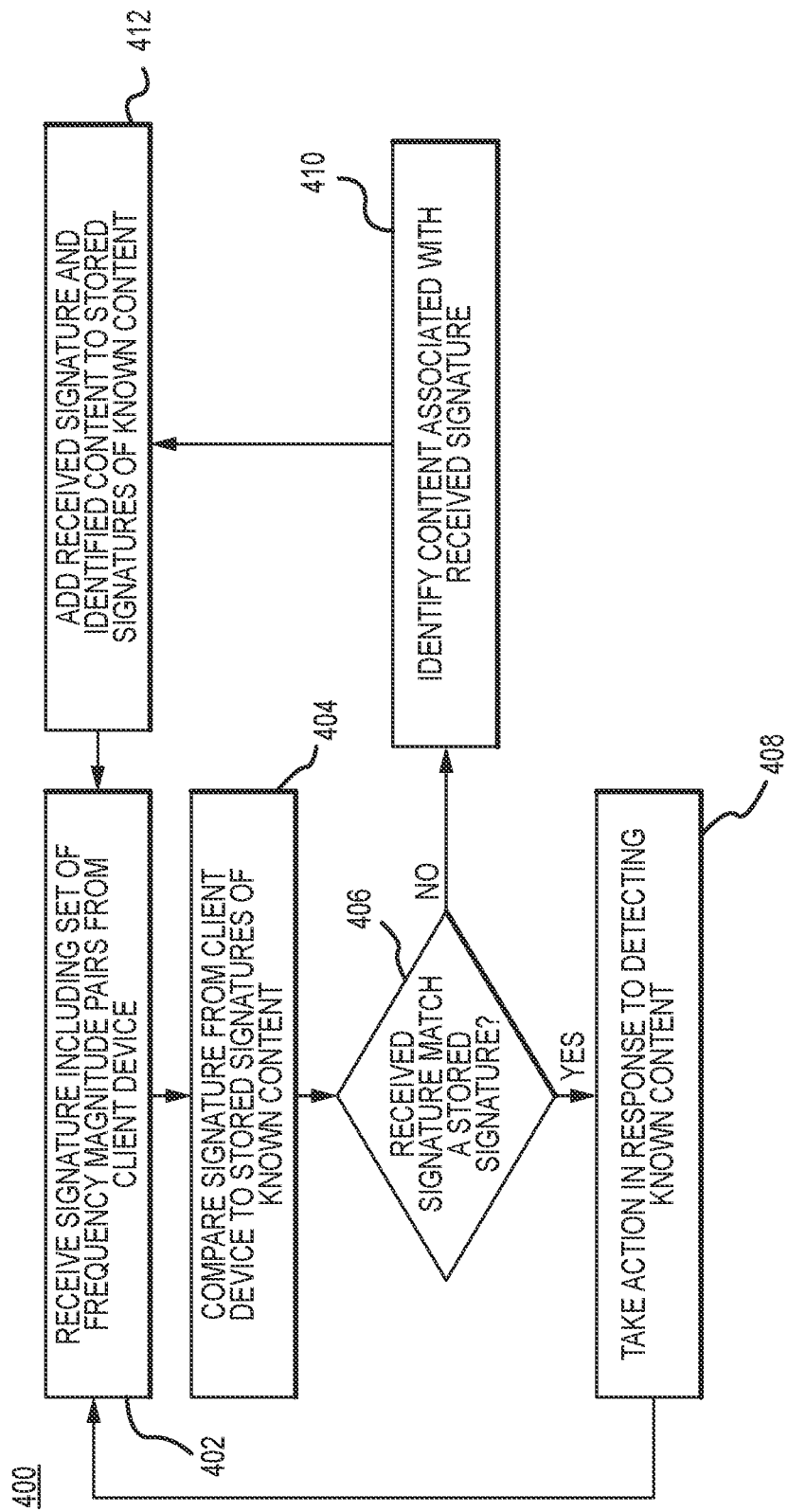
FIG. 5 illustrates an example process for analyzing signatures of media content received from resource constrained devices to detect known content.

Referring now to FIG. 5, an example automated process 400 is shown for analyzing signatures of media content. Automated process 400 may be executed by server 110, aggregation server 120, content source 140, or other suitable server-side computing devices. Automated process 400 enables system 100 to take various actions in response to detecting known content using signatures submitted by client devices 102.

A computing device receives a signature from a client device (Block 402). The signature includes a set of frequency-amplitude pairs associated with a piece of content encountered by client device 102. The computing device compares the received signature with signatures stored in database 130 (Block 404). The signatures stored in database 130 are signatures of known or previously encountered content. Stored signatures also include a set of frequency-amplitude pairs in a format suitable for comparison to the signature received from client device 102.

The computing device detects that the content associated with the received signature is known content by matching the signature from client device 102 to a stored signature (Block 406). The received signature matches the stored signatures when the frequency-magnitude pairs of the received signature and of the stored signature are the same or similar. For example, two signatures of five frequency-magnitude pairs each may match when the same five frequency bins are present in each signature. In another example, two signatures of five frequency-magnitude pairs each may match when the same five frequency bins are present in each signature with the same magnitudes. The computing device identifies the content associated with the received signature as known content by finding a matching signature associated with known content.

The server-side device takes action in response to detecting known content if the received signature matches the stored signature (Block 408). The server-side device attempts to identify the content associated with a received signature if the received signature does not match a stored signature (Block 410). Metadata or the original signal may be used to identify content associated with a received signature that does not match a stored signature. The duration of the unknown content may also be used to identify the content. The duration being detectable by the number of similar signatures received in an expected period for piece of content (e.g., 15 seconds, 30 seconds, or one minute for an advertisement). Identified content will be new advertisements or other content of interest occasionally. The server-side device adds the received signature and identified content to the stored signatures and known content in database 130 (Block 412). Some embodiments add the identified content and the received signature to database 130 if the received signature does not match a stored signature and the content is identified as content of interest. Various embodiments implement the actions described below.

Server devices continuously receive signatures from client devices 102 for analysis. The server-side computing devices identify new content by checking signatures against previous signatures in real-time. New signatures may be added to the database of previous signatures in association with the content identified by the new signatures. The server-side devices may implement various actions in response to detecting that the first piece of content includes a known piece of content.

Fingerprinting techniques and systems described herein may be used to recognize advertisements in real time in some embodiments. As used herein, real time may mean within 1 second, 2 seconds, 3 seconds, 4 seconds, 5 seconds, 6 seconds, 7 seconds, 8 seconds, 9 seconds, or 10 seconds. Distributed playback devices with limited processing power (e.g., no ability to process decimals, no ability to perform FFT, or no floating point calculations) can continuously analyze input signals to generate signatures of the input signal. The signatures are sent to an aggregation server 120 or other server 110 for comparison with signatures of known advertisements.

A network of client devices 102 can be used to identify ads across a broad geographic region such as a country, continent, or the world and subregions of various sizes such as, for example, cities, states, or local broadcast regions. Client devices 102 send signatures back to server 110, which compares the signatures of local ads to signatures of ads on national feeds. System 100 can thus distinguish national ads from local ads and take appropriate action in response to detecting either a national or local ad.

An original broadcast signal is typically about 10 seconds ahead of the content source 140 signal to client devices 102 reproducing the broadcast signal. System 100 using the network of client devices 102 and a channel server 160 can identify an ad within about 4 seconds using techniques described herein. Client devices 102 or channel server 160 ingesting a signal can generate a signature for an advertisement in the content of a broadcast signal before the content source 140 is going to transmit the same or similar content for consumption. Content source 140 may thus have about 6 seconds take action such as, for example, signaling other client devices 102 that an advertisement is coming. The client devices 102 do not have to identify the ads to be replaced themselves using system 100. Decentralized signature generation coupled with centralized the ad identification tends to make for a more seamless transition to a replaced ad on the STB feed due to the additional lead time available as a result of rapid ad detection.

Client devices 102 or peripheral devices connected to client devices may take localized action in response to signature matches in various embodiments. For example, such devices may adjust the audio output by raising, lowering, or muting the volume for the duration of an advertisement or other identified content. Such devices may also change a channel, dim the display, or black out the display for the duration of an advertisement or other identified content. The devices may reset the status after the identified content has passed.

Some embodiments of system 100 may realign advertisement breaks with the content stream. Currently video streams received from origin sources sometimes include digital markers according to ANSI/SCTE-35 standards indicating an ad is suitable for replacement. The digital markers indicate when an ad break should occur (e.g., "ad break coming up in four seconds"), but the markers are sometimes inaccurate or incorrect. Inaccurate or incorrect markers can result in broadcasting artifacts perceived by the end user such as, for example, a few frames of a replaced ad remaining in the stream before the replacement ad is played. System 100 may detect the actual break time using the signature collection stored in database 130 and analysis techniques described herein, thereby improving the user experience. Detected actual start and end times are used to accurately replace ads with otherwise inaccurate markers.

In various embodiments, the signal can originate with markers in a stream indicating locations where distributors can insert adds. However, the video delivery path sometimes strips markers. For example, sometimes broadcast channels lack markers when received by the distributer. The signal at the origin may then be synchronized with the broadcast signal that arrives sometimes a few seconds later. The matched ad locations may be used to insert markers at reconstituted locations. In that regard, signal matching techniques described herein may be used to synchronize different streams of the same channel. System 100 can detect and replace desired advertisements in a content stream without referring to markers that may be missing or inaccurate in the original content stream.

Benefits, other advantages, and solutions to problems have been described herein with regard to specific embodiments. Furthermore, the connecting lines shown in the various figures contained herein are intended to represent examples of functional relationships or couplings between the various elements. It should be noted that many alternative or additional functional relationships or connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the invention is accordingly to be limited by nothing other than the appended claims, in which reference to an element in the singular is not intended to mean "one and only one" unless explicitly so stated, but rather "one or more." Moreover, where a phrase similar to "A, B, or C" is used herein, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or device that comprises a list of elements does not include only those elements but may include other elements not expressly listed or inherent to such process, method, article, or device.

The term "exemplary" is used herein to represent one example, instance, or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process executed by a processor of a client device to generate signatures for media content, the automated process comprising:
    receiving an audio signal;
    selecting a window of the audio signal over a predetermined interval;
    scaling audio amplitudes of the audio signal into integers to generate scaled amplitudes of the audio signal;
    multiplying the scaled amplitudes of the audio signal by weighted multipliers from a first lookup table to generate tapered amplitudes of the audio signal, wherein the first lookup table comprises a plurality of weighted multipliers that apply a window function;
    permuting an order of the tapered amplitudes of the audio signal to generate permuted amplitudes;
    applying a discrete Fourier transform (DFT) to the permuted amplitudes to generate outputs associated with frequency bins, wherein the outputs comprise real components and imaginary components;
    calculating output magnitudes for the frequency bins based on the real components and the imaginary components associated with the frequency bins to generate frequency-amplitude pairs, wherein the frequency-amplitude pairs include the output magnitudes and the frequency bins; and
    generating a signature of the audio signal by selecting a predetermined number of frequency-amplitude pairs having dominant output magnitudes.

2. The automated process of claim 1, wherein applying the DFT generates a quantity of frequency bins equal to the predetermined interval of the window divided by a sampling rate.

3. The automated process of claim 2, wherein applying the DFT comprises accessing predetermined factors and predetermined remainders that are precalculated based on the quantity of frequency bins.

4. The automated process of claim 3, wherein applying the DFT comprises reading trigonometric values from a second lookup table.

5. The automated process of claim 1, wherein calculating an output amplitude comprises applying an integer square root function to a sum of a real component squared and an imaginary component squared.

6. The automated process of claim 1, wherein the window function is a Hamming window function.

7. The automated process of claim 1, wherein the predetermined number of frequency-amplitude pairs in the signature is greater than or equal to 5.

8. The automated process of claim 1, wherein the scaled amplitudes are generated by scaling input amplitude values in a starting range from −1 to 1 to scaled amplitude values in a scaled range of −32,768 to 32,767.

9. The automated process of claim 1, further comprising applying a filtering function to the outputs associated with the frequency bins before generating the signature of the audio signal by selecting the predetermined number of frequency-amplitude pairs having the dominant output magnitudes.

10. An automated process executed by a computing device to generate signatures for media content, the automated process comprising:
    receiving an audio signal;
    selecting a first window of the audio signal having a predetermined window duration, wherein the first window starts at a first start time;
    generating a first signature of the audio signal in the first window comprising a first set of frequency-amplitude pairs, wherein the first set of frequency-amplitude pairs are generated by applying a discrete Fourier transform (DFT) to a first set of permuted inputs;
    transmitting the first signature to a server for analysis;
    selecting a second window of the audio signal that begins at a second start time shifted by a predetermined shift interval from the first start time, wherein the second window has the predetermined window duration;
    generating a second signature of the audio signal in the second window comprising a second set of frequency-amplitude pairs, wherein the second set of frequency-amplitude pairs are generated by applying the DFT to a second set of permuted inputs; and transmitting the second signature to the server for analysis.

11. The automated process of claim 10, wherein each frequency-amplitude pair in the first set of frequency-amplitude pairs comprises an output amplitude and a frequency bin.

12. The automated process of claim 10, further comprising:

scaling audio amplitudes of the audio signal in the first window into integers to generate scaled amplitudes of the audio signal;

multiplying the scaled amplitudes of the audio signal by weighted multipliers from a first lookup table to generate tapered amplitudes of the audio signal, wherein the first lookup table comprises a plurality of weighted multipliers that apply a window function;

applying the DFT to the tapered amplitudes to generate outputs associated with frequency bins, wherein the outputs comprise real components and imaginary components;

calculating output magnitudes for the frequency bins based on the real components and the imaginary components associated with the frequency bins to generate frequency-amplitude pairs, wherein the frequency-amplitude pairs include the output magnitudes and the frequency bins; and generating the first signature of the audio signal by selecting the first set of frequency-amplitude pairs having dominant output magnitudes.

13. The automated process of claim 12, wherein applying the DFT comprises reading trigonometric values from a second lookup table.

14. The automated process of claim 12, wherein calculating an output amplitude comprises applying an integer square root function to a sum of a real component squared and an imaginary component squared.

15. The automated process of claim 10, wherein the predetermined window duration is in a range from 50 milliseconds to 150 milliseconds.

16. The automated process of claim 15, wherein the predetermined shift interval is in a range from 15 milliseconds to 40 milliseconds.

17. The automated process of claim 10, wherein the first set of frequency-amplitude pairs comprises 5 frequency-amplitude pairs.

18. A computing device comprising a processor, a non-transitory data storage and an interface to a network, wherein the non-transitory data storage is configured to store computer-executable instructions that when executed by the processor cause the processer to perform operations, comprising:

receiving an audio signal;

selecting a window of the audio signal beginning at a first start time and extending for a predetermined interval;

scaling audio amplitudes of the audio signal into integers to generate scaled amplitudes of the audio signal;

multiplying the scaled amplitudes of the audio signal by weighted multipliers from a first lookup table to generate tapered amplitudes of the audio signal, wherein the first lookup table comprises a plurality of weighted multipliers that apply a window function;

permuting an order of the tapered amplitudes of the audio signal to generate permuted amplitudes;

applying a discrete Fourier transform (DFT) to the permuted amplitudes to generate outputs associated with frequency bins, wherein the outputs comprise real components and imaginary components;

calculating output magnitudes for the frequency bins based on the real components and the imaginary components associated with the frequency bins to generate frequency-amplitude pairs, wherein the frequency-amplitude pairs include the output magnitudes and the frequency bins; and generating a signature of the audio signal by selecting a predetermined number of frequency-amplitude pairs having dominant output magnitudes.

19. The computing device of claim 18, wherein the operations further comprise:

selecting a second window of the audio signal that begins at a second start time shifted by a predetermined shift interval from the first start time, wherein the second window extends for the predetermined interval; and generating a second signature of the audio signal in the second window comprising a second set of frequency-amplitude pairs.

* * * * *